(12) United States Patent
Xiao et al.

(10) Patent No.: US 10,919,026 B2
(45) Date of Patent: Feb. 16, 2021

(54) METHODS FOR PREPARING CATALYST SYSTEMS

(71) Applicant: GM GLOBAL TECHNOLOGY OPERATIONS LLC, Detroit, MI (US)

(72) Inventors: Xingcheng Xiao, Troy, MI (US); Ming Yang, Novi, MI (US); Gongshin Qi, Troy, MI (US); Wei Li, Troy, MI (US)

(73) Assignee: GM GLOBAL TECHNOLOGY OPERATIONS LLC, Detrpot, MI (US)

( * ) Notice: Subject to any disclaimer, the term of this patent is extended or adjusted under 35 U.S.C. 154(b) by 76 days.

(21) Appl. No.: 16/056,894

(22) Filed: Aug. 7, 2018

(65) Prior Publication Data

US 2020/0047160 A1 Feb. 13, 2020

(51) Int. Cl.
*B01J 23/66* (2006.01)
*B01J 35/02* (2006.01)
*B01J 37/02* (2006.01)
*B82Y 40/00* (2011.01)
*B82Y 30/00* (2011.01)

(52) U.S. Cl.
CPC .............. *B01J 23/66* (2013.01); *B01J 35/026* (2013.01); *B01J 37/0221* (2013.01); *B01J 2523/17* (2013.01); *B01J 2523/18* (2013.01); *B01J 2523/19* (2013.01); *B01J 2523/821* (2013.01); *B01J 2523/822* (2013.01); *B01J 2523/824* (2013.01); *B01J 2523/825* (2013.01); *B01J 2523/827* (2013.01); *B01J 2523/828* (2013.01); *B82Y 30/00* (2013.01); *B82Y 40/00* (2013.01)

(58) Field of Classification Search
CPC ....... B01J 23/66; B01J 35/026; B01J 37/0221
See application file for complete search history.

(56) References Cited

U.S. PATENT DOCUMENTS

| 9,649,627 | B1* | 5/2017 | Xiao | B01J 23/40 |
| 9,827,562 | B2 | 11/2017 | Qi et al. | |
| 9,901,907 | B1 | 2/2018 | Xiao et al. | |
| 10,035,133 | B2 | 7/2018 | Yang et al. | |

(Continued)

OTHER PUBLICATIONS

U.S. Appl. No. 15/418,214, GM Global Technology Operations LLC.

*Primary Examiner* — James A Fiorito

(57) ABSTRACT

Methods for preparing a catalyst system, include providing a catalytic substrate comprising a catalyst support having a surface with a plurality of metal catalytic nanoparticles bound thereto and physically mixing and/or electrostatically combining the catalytic substrate with a plurality of oxide coating nanoparticles to provide a coating of oxide coating nanoparticles on the surface of the catalytic nanoparticles. The metal catalytic nanoparticles can be one or more of ruthenium, rhodium, palladium, osmium, iridium, and platinum, rhenium, copper, silver, and gold. Physically combining can include combining via ball milling, blending, acoustic mixing, or theta composition, and the oxide coating nanoparticles can include one or more oxides of aluminum, cerium, zirconium, titanium, silicon, magnesium, zinc, barium, lanthanum, iron, strontium, and calcium. The catalyst support can include one or more oxides of aluminum, cerium, zirconium, titanium, silicon, magnesium, zinc, barium, iron, strontium, and calcium.

19 Claims, 1 Drawing Sheet

(56) References Cited

U.S. PATENT DOCUMENTS

Figure 1:
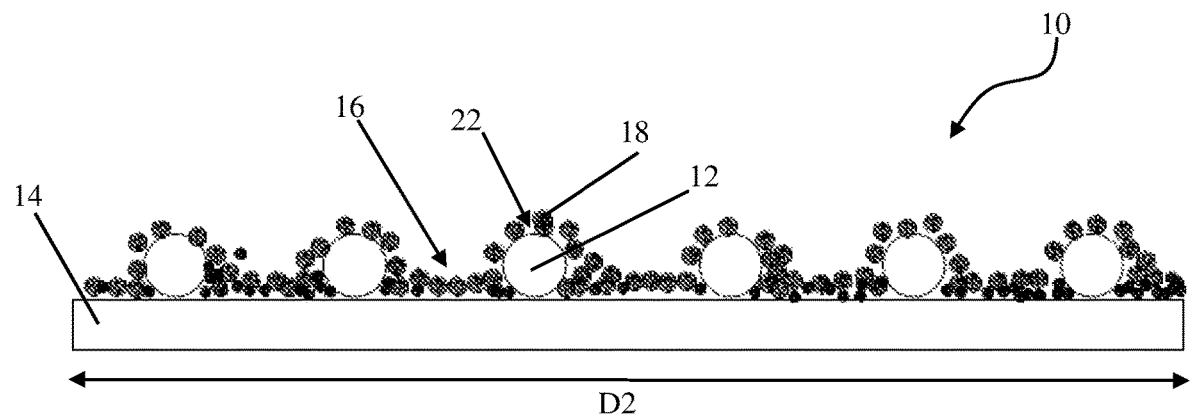

2014/0286855 A1* 9/2014 Desmedt ............... B01J 23/464
    423/584
2017/0114458 A1  4/2017 Xiao et al.
2018/0185831 A1  7/2018 Yang et al.
2018/0185832 A1  7/2018 Xiao et al.

* cited by examiner

METHODS FOR PREPARING CATALYST SYSTEMS

BACKGROUND

Catalytic nanoparticles can make up the active sites of catalysts used in a variety of applications, such as for the production of fuels, chemicals and pharmaceuticals, and for emissions control from automobiles, factories, and power plants. Because catalytic nanoparticles tend to agglomerate, this decreases their surface area and active site accessibility, so they are often coupled to support materials. The supports physically separate the catalytic nanoparticles to prevent agglomeration, and to increase their surface area and active site accessibility. Thus, catalyst systems typically include one or more compounds; a porous catalyst support material; and one or more optional activators.

After continued use, especially at elevated temperatures, catalyst systems comprising supported catalytic nanoparticles lose catalytic activity due to sintering, e.g., thermal deactivation that occurs at high temperatures. Through various mechanisms, sintering results in changes in metal particle size distribution over a support and an increase in mean particle size; hence, a decrease in surface area for the active catalyst compounds. For example, particle migration and coalescence is a form of sintering where particles of catalytic nanoparticles move or diffuse across a support surface, or through a vapor phase, and coalesce with another nanoparticle, leading to nanoparticle growth. Ostwald ripening is another form of sintering wherein migration of mobile species are driven by differences in free energy and local atom concentrations on a support surface. After sintering processes occur, catalyst activity can decrease. Therefore, catalyst systems are often loaded with a sufficient amount of supported catalytic nanoparticles to account for a loss of catalytic activity over time and to continue to have the ability to meet, for example, emissions standards over a long period of operation at high temperature.

SUMMARY

Provided are methods for preparing a catalyst system, including providing a catalytic substrate comprising a catalyst support having a surface with a plurality of metal catalytic nanoparticles bound thereto, and physically mixing the catalytic substrate with a plurality of oxide coating nanoparticles to provide a coating of oxide coating nanoparticles on the surface of the catalytic nanoparticles. The metal catalytic nanoparticles can include one or more of ruthenium, rhodium, palladium, osmium, iridium, and platinum, rhenium, copper, silver, and gold. Physically combining can include combining via ball milling, blending, acoustic mixing, or theta composition. The oxide coating nanoparticles can include one or more oxides of aluminum, cerium, zirconium, titanium, silicon, magnesium, zinc, barium, lanthanum, iron, strontium, and calcium. The metal catalytic nanoparticles comprise one or more metals selected from the list consisting of ruthenium, rhodium, palladium, osmium, iridium, and platinum, rhenium, copper, silver, and gold. The average diameter of the plurality of metal catalytic nanoparticles is about 1 nm to about 10 nm. The oxide coating nanoparticles have an average diameter less than the average diameter of the catalytic nanoparticles. The catalyst support comprises one or more oxides of aluminum, cerium, zirconium, titanium, silicon, magnesium, zinc, lanthanum, barium, iron, strontium, and calcium. The catalyst support comprises one or more metal oxides selected from the group consisting of $Al_2O_3$, $CeO_2$, $ZrO_2$, $TiO_2$, $SiO_2$, $La_2O_3$, $MgO$, and $ZnO$. The catalyst support comprises one or more metal oxides selected from the group consisting of $CeO_2$, $ZrO_2$, $La_2O_3$, and $Al_2O_3$.

Methods for preparing a catalyst system can include providing a catalytic substrate comprising a catalyst support having a surface with a plurality of metal catalytic nanoparticles bound thereto, and physically mixing or electrostatically combining the catalytic substrate with a plurality of oxide coating nanoparticles to provide a coating of oxide coating nanoparticles on the surface of the catalytic nanoparticles. The metal catalytic nanoparticles can include one or more of ruthenium, rhodium, palladium, osmium, iridium, and platinum, rhenium, copper, silver, and gold. Physically combining can include combining via ball milling, blending, acoustic mixing, or theta composition. The oxide coating nanoparticles can include one or more oxides of aluminum, cerium, zirconium, titanium, silicon, magnesium, zinc, barium, lanthanum, iron, strontium, and calcium. The metal catalytic nanoparticles can include one or more metals selected from the list consisting of ruthenium, rhodium, palladium, osmium, iridium, and platinum, rhenium, copper, silver, and gold. The average diameter of the plurality of metal catalytic nanoparticles can be about 1 nm to about 10 nm. The oxide coating nanoparticles can have an average diameter less than the average diameter of the catalytic nanoparticles. The catalyst support can include one or more oxides of aluminum, cerium, zirconium, titanium, silicon, magnesium, zinc, lanthanum, barium, iron, strontium, and calcium. The catalyst support can include one or more metal oxides selected from the group consisting of $Al_2O_3$, $CeO_2$, $ZrO_2$, $TiO_2$, $SiO_2$, $La_2O_3$, $MgO$, and $ZnO$. The catalyst support can include one or more metal oxides selected from the group consisting of $CeO_2$, $ZrO_2$, and $La_2O_3$, $Al_2O_3$.

Methods for preparing a catalyst system include providing a catalytic substrate comprising a catalyst support having a surface with a plurality of metal catalytic nanoparticles bound thereto, and physically mixing the catalytic substrate with a plurality of oxide coating nanoparticles to provide a coating of oxide coating nanoparticles on the surface of the catalytic nanoparticles. The catalyst support can include alumina or ceria, and the metal catalytic nanoparticles comprise one or more metals selected from the list consisting of ruthenium, rhodium, palladium, osmium, iridium, and platinum, rhenium, copper, silver, and gold. Physically combining can include combining via ball milling, blending, acoustic mixing, or theta composition. The oxide coating nanoparticles can include one or more oxides of aluminum, cerium, zirconium, titanium, silicon, magnesium, zinc, barium, iron, strontium, and lanthanum. The average diameter of the plurality of metal catalytic nanoparticles can be about 1 nm to about 10 nm. The oxide coating nanoparticles can have an average diameter less than the average diameter of the catalytic nanoparticles. The catalyst support can include one or more metal oxides selected from the group consisting of $CeO_2$, $ZrO_2$, and $La_2O_3$, $Al_2O_3$. The catalyst system can have a catalytic loading of about 0.25% to about 6%. Physically mixing the catalytic substrate with the plurality of oxide coating nanoparticles can occur without the presence of solvents.

Other objects, advantages and novel features of the exemplary embodiments will become more apparent from the following detailed description of exemplary embodiments and the accompanying drawings.

DRAWINGS

The drawings described herein are for illustrative purposes only of selected embodiments and not all possible implementations, and are not intended to limit the scope of the present disclosure.

Figure 2:
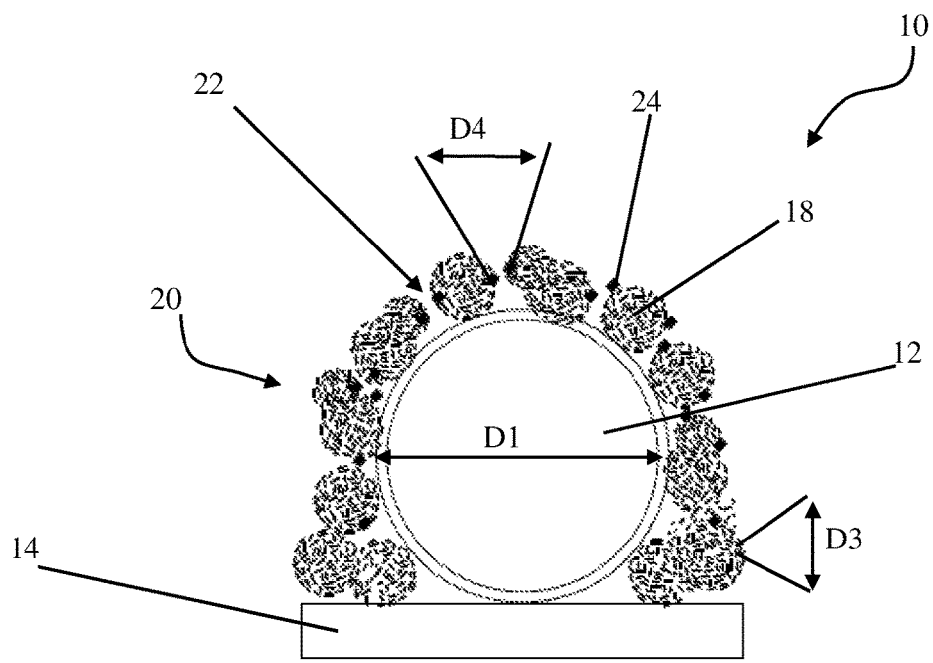

FIG. 1 illustrates a schematic side-view of a sinter-resistant catalyst system, according to one or more embodiments; and FIG. 2 illustrates an exploded view of a portion of the catalyst system of FIG. 1, according to one or more embodiments.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present technology provides a dry combination-based approach for minimizing or eliminating sintering, and reducing the catalytic loading of catalyst systems while still providing desired catalytic performance. The current dry combination-based approach is low cost and results in high thermal durability catalyst systems while reducing catalyst metal loading requirements leading to significant cost savings. For example, relative to a conventional catalyst system having the same catalyst and support material, but lacking the porous coating, the present technology reduces catalytic metal loading requirements while still maintaining desired catalytic performance. Further, the dry-combination methods provided herein are environmentally friendly and generate minimal undesirable process byproducts.

With reference to FIG. 1, the current technology also provides a catalyst system 10 that resists sintering and retains catalytic activity after prolonged exposures to elevated temperatures. The catalyst system 10 can be a catalyst system generated by the methods provided herein. The catalyst includes catalytic nanoparticles 12 bound to a catalyst support 14 and a coating 16 of oxide coating nanoparticles 18 disposed on the catalytic nanoparticles 12 and optionally on the catalyst support 14. In some embodiments, the catalytic nanoparticles 12 are either directly or indirectly coupled to the catalyst support 14 by the physical combination methods described below. The catalytic nanoparticles 12 have a catalytic loading on the catalyst support (i.e., the weight percent of the catalytic nanoparticles 12 relative to the entire catalyst system 10) of about 0.1% to about 10%, about 0.25% to about 6%, or about 1% to about 4%. Unless otherwise specified, all percentages expressed herein refer to percentages by weight. In some embodiments, the catalytic loading of the catalytic nanoparticles 12 on the catalyst support 14 is about 1.5%. An exploded view of the catalyst system 10 showing a catalytic nanoparticle 12 bound to a catalyst support 14 (i.e., a catalytic substrate 20) is shown in FIG. 2.

It should be noted the catalyst support 14 may have shapes or forms other than a planar structure as shown in FIG. 1, for example, it may have conventional monolith or honeycomb shapes or the catalyst support 14 may be in the form of beads for a packed bed catalyst, as known in the art. The coating 16 of oxide coating nanoparticles 18 can cover at least about 5% of the surface area of the catalytic nanoparticles 12, and up to about 100% of the surface area of the catalytic nanoparticles 12. The catalyst system 10 comprises a plurality of pores 22, such that reacting gas molecules can access the catalytic nanoparticles 12 having catalytic activity, yet metal particles or vapors 24 are prevented from coalescing with the catalytic nanoparticles 12. In some embodiments, the pores 22 can have an average diameter $D4$ of about 0.5 nm to about 30 nm. Therefore, the coating 16 renders the catalyst system 10 resistant to sintering or thermal degradation by increasing the surface area of the catalyst system 10 and trapping or depositing the particles or vapors 24 generated from particle migration and coalescence or Ostwald ripening resulting from the catalyst system 10 being continuously subjected to elevated temperatures. Moreover, particles 24 trapped or deposited in the pores 22 or the coating 16 retain catalytic activity, which can be expressed as catalytic metal dispersion.

"Catalyst metal dispersion" refers to a ratio of metal catalyst 12 surface sites to a mass of an entire catalyst system 10. Therefore, a catalyst system with a high dispersion will have smaller and more highly dispersed metal catalysts relative to a catalyst system with a low dispersion. Relative to a catalyst system equivalent to the catalyst system 10 described herein, but without a porous coating, a catalyst system having an increased resistance to sintering has a dispersion loss of less than about 74% after exposure to a temperature of about 650° C. for a time period of about 2 hours. A catalyst system that that resists sintering is a catalyst system that undergoes a dispersion loss of less than or equal to about 20%, less than or equal to about 15%, or less than or equal to about 10% after exposure to a temperature of about 650° C. for a time period of about 2 hours.

In some embodiments, the oxide coating nanoparticles 18 of the coating 16 comprise the same metal oxide composition as the catalyst support 14 composition. In other embodiments, the oxide coating nanoparticles 18 of the coating 16 comprise a different metal oxide as the support 14. In yet other embodiments, the coating 16 comprises a plurality of different metal oxides. Therefore, the catalyst system 10 may include a single species of catalytic nanoparticle 12 and catalyst support 14 or a plurality of catalytic nanoparticles 12 and metal oxide supports 14.

Provided herein are methods for preparing a catalyst system 10 through a dry combination-based approach. The method comprises binding at least one catalytic nanoparticle 12 to a catalyst support 14 comprising a metal oxide, and applying a coating 16 of oxide coating nanoparticles 18 to the at least one catalytic nanoparticle 12 and optionally to the catalyst support 14. The catalytic nanoparticle 12 can comprise a platinum group metal (PGM) nanoparticle, such as one or more nanoparticles of ruthenium (Ru), rhodium (Rh), palladium (Pd), osmium (Os), iridium (Ir), and platinum (Pt), and other metals such as one or more nanoparticles of rhenium (Re), copper (Cu), silver (Ag), and gold (Au). In general, a smaller catalytic nanoparticle 12 size is desired in order to increase the surface area per weight or volume of the catalytic metal bound to the support. In some embodiments, the catalytic nanoparticle 12, as applied to the catalyst support 14, can have an average diameter of about 0.5 nm to about 50 nm, about 1 nm to about 10 nm, or about 4 nm to about 6 nm, or up to about 12 nm, or up to about 50 nm. It is understood that aggregation of the catalytic nanoparticles 12 may occur during use of the catalyst system 10.

The catalyst support 14 can comprise a thermally stable, porous material, such as a metal oxide. In some embodiments, the catalyst support 14 can comprise one or more oxides of aluminum (Al), cerium (Ce), zirconium (Zr), titanium (Ti), silicon (Si), magnesium (Mg), zinc (Zn), lanthanum (La), barium (Ba), iron (Fe), strontium (Sr), and calcium (Ca). In some embodiments, the catalyst support 14 can comprise one or more of $Al_2O_3$, $CeO_2$, $ZrO_2$, $TiO_2$, $SiO_2$, MgO, ZnO, $La_2O_3$, BaO, $Fe_2O_3$, $Fe_3O_4$, SrO, and CaO. In some embodiments, the catalyst support 14 can comprise one or more metal oxides selected from the group consisting of $Al_2O_3$, $CeO_2$, $ZrO_2$, $TiO_2$, $SiO_2$, MgO, ZnO, $La_2O_3$, BaO, $Fe_2O_3$, $Fe_3O_4$, SrO, and CaO. In some embodiments, the catalyst support can comprise one or more metal oxides selected from the group consisting of Al2O3, CeO2, ZrO2, TiO2, SiO2, La2O3, MgO, and ZnO. In some embodiments, the catalyst support 14 can comprise one or more of $CeO_2$, $ZrO_2$, and $Al_2O_3$. In some embodiments, the catalyst support 14 can comprise one or more metal oxides selected from the group consisting of $CeO_2$, $ZrO_2$, $La_2O_3$, and $Al_2O_3$. The catalyst support 14 can have a surface area of about 50 $m^2/g$ to about 200 $m^2/g$, or about 5 $m^2/g$ to about 2,000 $m^2/g$, in some embodiments. The catalyst support 14 can have a diameter of about 10 nm to about 50,000 nm, although other sizes are practicable. In general, the catalyst support 14 will have a diameter which is at least equal to the diameter of the catalytic nanoparticles 12. In one embodiment, the catalyst support 14 has a diameter of about 15 nm to about 25 nm, and the catalytic nanoparticle has a diameter to about 0.5 nm to about 1 nm.

A plurality of catalytic nanoparticles 12 can be bound to the catalyst support 14 by conventional methods known in the art, such as by wetness impregnation, ion adsorption, or ion exchange, among others. For example, co-owned U.S. patent application Ser. No. 15/334,109 describes some practicable methods for binding catalytic nanoparticles 12 to the catalyst support 14. The catalytic nanoparticles 12 can be the same catalytic metal, or a plurality of catalytic metals as described above.

After binding a plurality of catalytic nanoparticles 12 to a catalytic support to obtain a catalytic substrate 20, the catalytic substrate 20 is physically combined with oxide coating nanoparticles 18 in order to form the coating 16 of oxide coating nanoparticles 18 on at least the catalytic nanoparticles 12. The oxide coating nanoparticles 18 can comprise any materials suitable for the catalyst support 14, as described above, including one or more oxides of aluminum (Al), cerium (Ce), zirconium (Zr), titanium (Ti), silicon (Si), magnesium (Mg), zinc (Zn), barium (Ba), lanthanum (La), iron (Fe), strontium (Sr), and calcium (Ca). Non-limiting examples of such metal oxides include $Al_2O_3$, $CeO_2$, $ZrO_2$, $TiO_2$, $SiO_2$, MgO, ZnO, BaO, $La_2O_3$, $K_2O$, $Na_2O$, $Fe_2O_3$, $Fe_3O_4$, SrO, and CaO. In some embodiments, the oxide coating nanoparticles 18 can comprise one or more oxides of aluminum, cerium, zirconium, titanium, silicon, magnesium, zinc, barium, and lanthanum. The average diameter of the oxide coating nanoparticles 18 can be less than the average diameter of the catalytic nanoparticles 12. The oxide coating nanoparticles 18 have an average diameter of about 0.2 nm to about 50 nm, in some embodiments. In some embodiments, the oxide coating nanoparticles 18 can have an average diameter less than the average diameter of the catalytic nanoparticles 12. In some embodiments, the oxide coating nanoparticles 18 can comprise about 5% to about 50% of the combined weight of the oxide coating nanoparticles 18 and the catalytic nanoparticles 12 of the catalytic system 10.

Physically combining the catalytic substrate 20 with the oxide coating nanoparticles 18 reduces the time, cost, and complexity of the combination process relative to alternative processes (e.g., wet chemistry processes). Physically combining the catalytic substrate 20 with the oxide coating nanoparticles 18 can comprise physical mixing and/or electrostatic combination without the use of solvents. Physical mixing can include ball milling, blending (e.g., using a mortar and pestil), acoustic mixing, or theta composition. Theta composition utilizes a theta composer which generally includes a rotating vessel with an internal rotor which is rotating in a non-similar direction (e.g., opposite) relative to the vessel. The internal rotor may also rotate at a different speed (e.g., faster) than the vessel. In general, the duration and intensity of physical mixing can be selected to achieve a desired coating thickness and/or uniformity of oxide coating nanoparticles 18 applied to the catalytic nanoparticles 12 and/or the catalyst support 14. Electrostatic combination can include electrostatic spraying, which comprises applying a charge to one or more of the catalytic substrate 20 and oxide coating nanoparticles 18 prior to combination.

In one example, alumina nanoparticles with an average diameter of about 50 nm were physically ground with a pestle in a mortar for ten minutes with a plurality of catalytic supports having an average substrate diameter of about 2,000 nm. The weight ratio of alumina nanoparticles to the alumina supports was about 1:10. The porous dry powder coating applied to the catalytic supports had a thickness of about 100 nm to about 300 nm.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for preparing a catalyst system, the method comprising:
   providing a catalytic substrate comprising a catalyst support having a surface with a plurality of metal catalytic nanoparticles bound thereto, wherein the metal catalytic nanoparticles comprise one or more of ruthenium, rhodium, palladium, osmium, iridium, platinum, rhenium, copper, silver, and gold; and physically combining the catalytic substrate with a plurality of oxide coating nanoparticles to provide a coating of oxide coating nanoparticles on the surface of the catalytic nanoparticles, wherein physically combining comprises combining without the use of solvents via ball milling, blending, acoustic mixing, or theta composition, and the oxide coating nanoparticles comprise one or more oxides of aluminum, cerium, zirconium, titanium, silicon, magnesium, zinc, barium, lanthanum, iron, strontium, and calcium.

2. The method of claim 1, wherein the plurality of metal catalytic nanoparticles are selected from the list consisting of ruthenium, rhodium, palladium, osmium, iridium, platinum, rhenium, copper, silver, and gold.

3. The method of claim 1, wherein the average diameter of the plurality of metal catalytic nanoparticles is about 1 nm to about 10 nm.

4. The method of claim 1, wherein the oxide coating nanoparticles have an average diameter less than the average diameter of the catalytic nanoparticles.

5. The method of claim 1, wherein the catalyst support comprises one or more oxides of aluminum, cerium, zirconium, titanium, silicon, magnesium, zinc, lanthanum, barium, iron, strontium, and calcium.

6. The method of claim 1, wherein the catalyst support comprises one or more metal oxides selected from the group consisting of $Al_2O_3$, $CeO_2$, $ZrO_2$, $TiO_2$, $SiO_2$, $La_2O_3$, MgO, and ZnO.

7. The method of claim 1, wherein the catalyst support comprises one or more metal oxides selected from the group consisting of $CeO_2$, $ZrO_2$, $La_2O_3$, and $Al_2O_3$.

8. A method for preparing a catalyst system, the method comprising:

providing a catalytic substrate comprising a catalyst support having a surface with a plurality of metal catalytic nanoparticles bound thereto, wherein the metal catalytic nanoparticles comprise one or more of ruthenium, rhodium, palladium, osmium, iridium, platinum, rhenium, copper, silver, and gold; and physically combining or electrostatically combining the catalytic substrate with a plurality of oxide coating nanoparticles to provide a coating of oxide coating nanoparticles on the surface of the catalytic nanoparticles, wherein physically combining comprises combining without the use of solvents via ball milling, blending, acoustic mixing, or theta composition, and the oxide coating nanoparticles comprise one or more oxides of aluminum, cerium, zirconium, titanium, silicon, magnesium, zinc, barium, lanthanum, iron, strontium, and calcium.

9. The method of claim 8, wherein the plurality of metal catalytic nanoparticles are selected from the list consisting of ruthenium, rhodium, palladium, osmium, iridium, platinum, rhenium, copper, silver, and gold.

10. The method of claim 8, wherein the average diameter of the plurality of metal catalytic nanoparticles is about 1 nm to about 10 nm.

11. The method of claim 8, wherein the oxide coating nanoparticles have an average diameter less than the average diameter of the catalytic nanoparticles.

12. The method of claim 8, wherein the catalyst support comprises one or more oxides of aluminum, cerium, zirconium, titanium, silicon, magnesium, zinc, lanthanum, barium, iron, strontium, and calcium.

13. The method of claim 8, wherein the catalyst support comprises one or more metal oxides selected from the group consisting of $Al_2O_3$, $CeO_2$, $ZrO_2$, $TiO_2$, $SiO_2$, $La_2O_3$, MgO, and ZnO.

14. The method of claim 8, wherein the catalyst support comprises one or more metal oxides selected from the group consisting of $CeO_2$, $ZrO_2$, $La_2O_3$, and $Al_2O_3$.

15. A method for preparing a catalyst system, the method comprising:

providing a catalytic substrate comprising a catalyst support having a surface with a plurality of metal catalytic nanoparticles bound thereto, wherein the catalyst support comprises alumina or ceria, and the metal catalytic nanoparticles comprise one or more metals selected from the list consisting of ruthenium, rhodium, palladium, osmium, iridium, platinum, rhenium, copper, silver, and gold; and physically combining the catalytic substrate with a plurality of oxide coating nanoparticles to provide a coating of oxide coating nanoparticles on the surface of the catalytic nanoparticles, wherein physically combining comprises combining without the use of solvents via ball milling, blending, acoustic mixing, or theta composition, and the oxide coating nanoparticles comprise one or more oxides of aluminum, cerium, zirconium, titanium, silicon, magnesium, zinc, barium, iron, strontium, and lanthanum.

16. The method of claim 15, wherein the average diameter of the plurality of metal catalytic nanoparticles is about 1 nm to about 10 nm.

17. The method of claim 15, wherein the oxide coating nanoparticles have an average diameter less than the average diameter of the catalytic nanoparticles.

18. The method of claim 15, wherein the catalyst support comprises one or more metal oxides selected from the group consisting of $CeO_2$, $ZrO_2$, $La_2O_3$, and $Al_2O_3$.

19. The method of claim 15, wherein the catalyst system has a catalytic loading of about 0.25% to about 6%.

* * * * *